Patented Sept. 23, 1924.

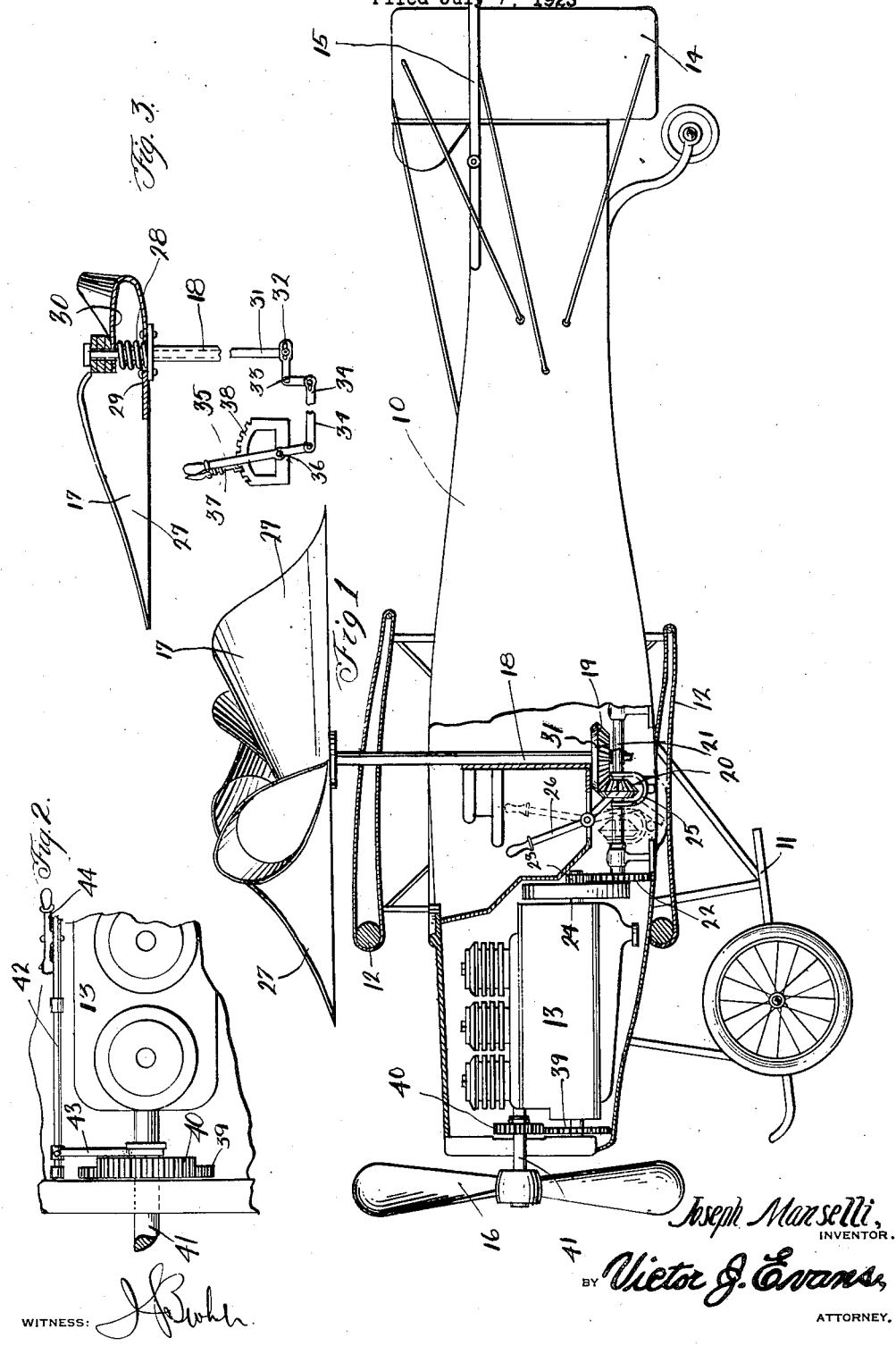

1,509,247

UNITED STATES PATENT OFFICE.

JOSEPH MANSELLI, OF MOUNT VERNON, NEW YORK.

AIRCRAFT.

Application filed July 7, 1923. Serial No. 650,089.

*To all whom it may concern:*

Be it known that I, JOSEPH MANSELLI, a subject of the King of Italy, residing at Mount Vernon, in the county of Westchester and State of New York, have invented new and useful Improvements in Aircraft, of which the following is a specification.

This invention relates to air craft.

Some of the objects of the present invention are: To employ on a heavier than aircraft tractor means an helicoptic or vertically lifting means, which are selectively operable or operable in units; to employ on a heavier than air craft a helicoplane which is driven by the engine of the craft and which is capable of being warped to act with greater or less action on the air for lifting action and to be warped to such a degree as to offer a minimum resistance when not operating.

With these and other objects in view, the invention resides in the particular provision, relative disposition of the parts hereinafter described and illustrated in the accompanying drawing, in which:—

Figure 1 is a sectional elevation of an air craft in the form of a biplane embodying the present invention.

Figure 2 is a plan view of the detail of the invention.

Figure 3 is a detail view of the helicoplane and a means for warping the same.

It is to be understood that the present invention which will be hereinafter described in detail, may be applied to different types of air craft and no limitation is therefore made to its application shown in the present instance in which the same is shown as applied to a tractor type of biplane which will include fuselage 10 having an undercarriage 11, planes 12, engine 13, rudder 14, elevators 15 and tractor propeller 16 driven by the engine 13.

In order to give a greater lifting power to the craft the same is equipped with a helicoplane 17 positioned directly over the upper plane 12 and driven by the engine 13 by virtue of driving connections to be presently described. A vertically disposed shaft 18 is employed to which a portion of the helicoplane 17 is connected for rotation therewith. The lower end of the shaft 18 has a gear 19 which meshes with a gear 20 slidably mounted on a shaft 21 mounted in suitable bearings. One end of the shaft 21 has a gear 22 which meshes with a gear 23 on a drive shaft 24 of the engine 13. The gear 20 is movable into and out of engagement with the gear 19 by virtue of a yoke 25 which embraces said gear 20 and which yoke is movable by a pivotally mounted lever 26. It will now be manifest that by shifting the gear 20 into and out of engagement with the gear 19 the helicoplane 17 may be positively rotated or free from rotation by the engine 13.

In order that the helicoplane 17 may have the air engaged surfaces 26 thereof warped or flexed there is provided a spring 28 which surrounds the shaft 18 and which is arranged between the central portion 29 of the helicoplane and the extremities 30 of the air engaged portions 27 which surround the shaft 18 by virtue of openings. The extremities are connected to a tubular shaft 31 which surrounds the shaft 18 in the lower end of the shaft 31 of a forked bell crank 32 pivoted as at 33. One arm of the crank 32 has connected thereto a rod 34 whose other end is connected to a lever 35, pivoted as at 36 and having a spring actuated dog 37 which co-acts with the teeth of a segment 38. It will now be manifest that by manipulating the lever 35 the portions 27 of the helicoplane may be warped to different degrees and in the position of these portions shown in Figure 3 of the drawing, they will offer a minimum resistance to the air, while in the position of such positions as shown in Figure 1 they will be able to screw into the atmosphere for forcing air downwardly and thus causing a lifting action or helicoptic action.

The tractor propeller 16 is driven by the engine 13 by virtue of a gear 39 on the drive shaft 24 which meshes with a gear 40 on the propeller shaft 41. The gear 40 is movably splined on the shaft 21 and operating means in the nature of a slidable rod 42, fork 43, by virtue of which the gear 40 may be moved into and out of mesh with the gear 39; a lever 44 being connected with the rod 42 for that purpose.

From the foregoing, it will be manifest that either the tractor propeller 16 or the helicoplane may be put into operation or both may be put into operation at the same time for imparting translatory motion to the craft.

What is claimed as new is:—

1. In an air craft, a helicoplane, and means for warping portions of said helicoplane, said means including a tubular shaft, a shaft slidable in said tubular shaft, a portion of said helicoplane attached to said tubular shaft, and a portion attached to the sliding shaft, and operating means for moving the sliding shaft in one direction, and automatic means for moving said shaft in an opposite direction upon the release of said operating means.

2. A flying machine having an engine, propelling means operable by said engine, a vertical tubular shaft disposed approximately at the center of gravity of the machine, means operable by the engine for imparting rotary movement to said tubular shaft, a slidable shaft extending through said tubular shaft and beyond the top of the same, a helicoplane having a portion of the same attached to said tubular shaft, and a portion attached to said slidable shaft, and controlling means for actuating said sliding shaft to vary the air resistance of said helicoplane, and automatic means for returning said helicoplane to normal position after the release of said controlling means.

In testimony whereof I have affixed my signature.

JOSEPH MANSELLI.